Aug. 24, 1954     P. B. CAMP     2,687,196
CLUTCH AND BRAKE OPERATING MECHANISM
Filed Aug. 20, 1949     5 Sheets-Sheet 1
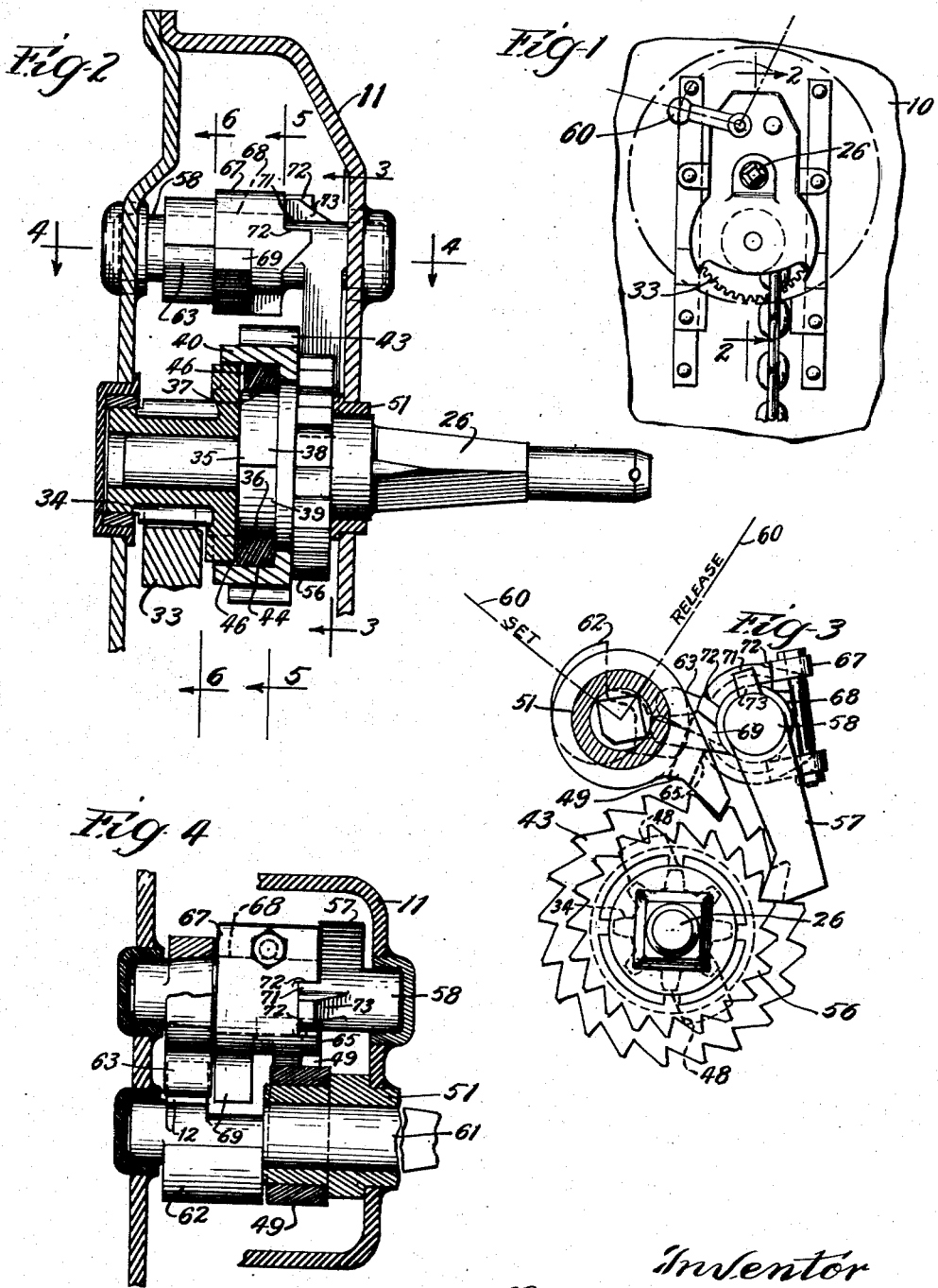
Inventor
Percy B. Camp
By:- Mann and Brown
Attys.

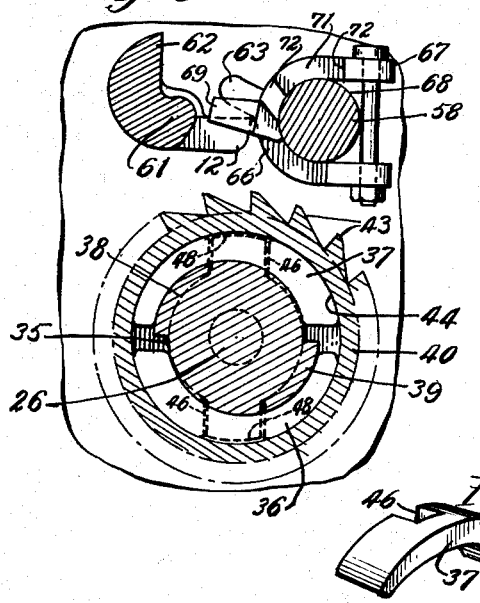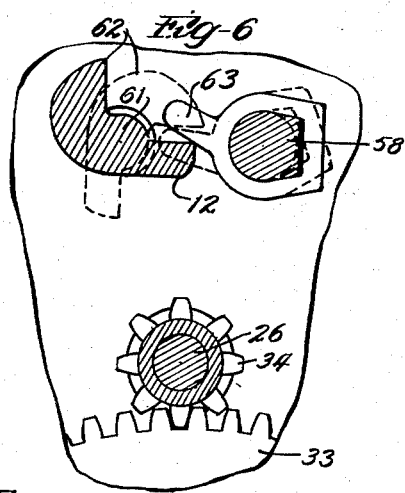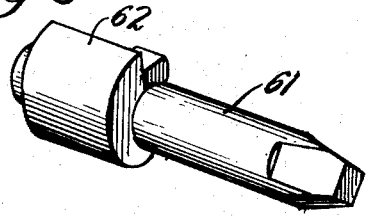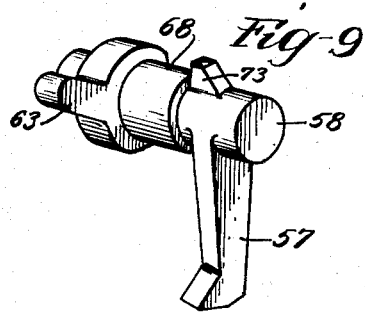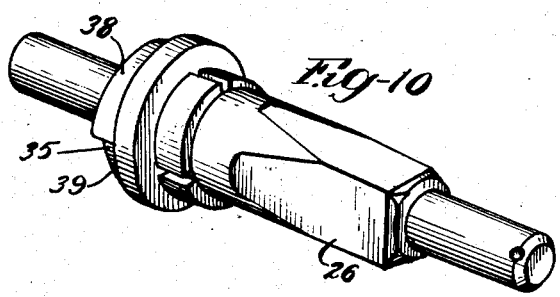

Aug. 24, 1954
P. B. CAMP
2,687,196
CLUTCH AND BRAKE OPERATING MECHANISM
Filed Aug. 20, 1949
5 Sheets-Sheet 3
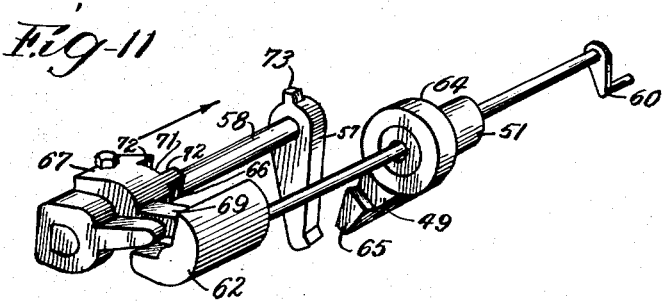
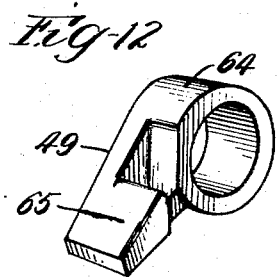
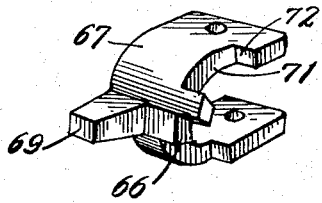
Inventor
Percy B. Camp
By Mann and Brown
Attys

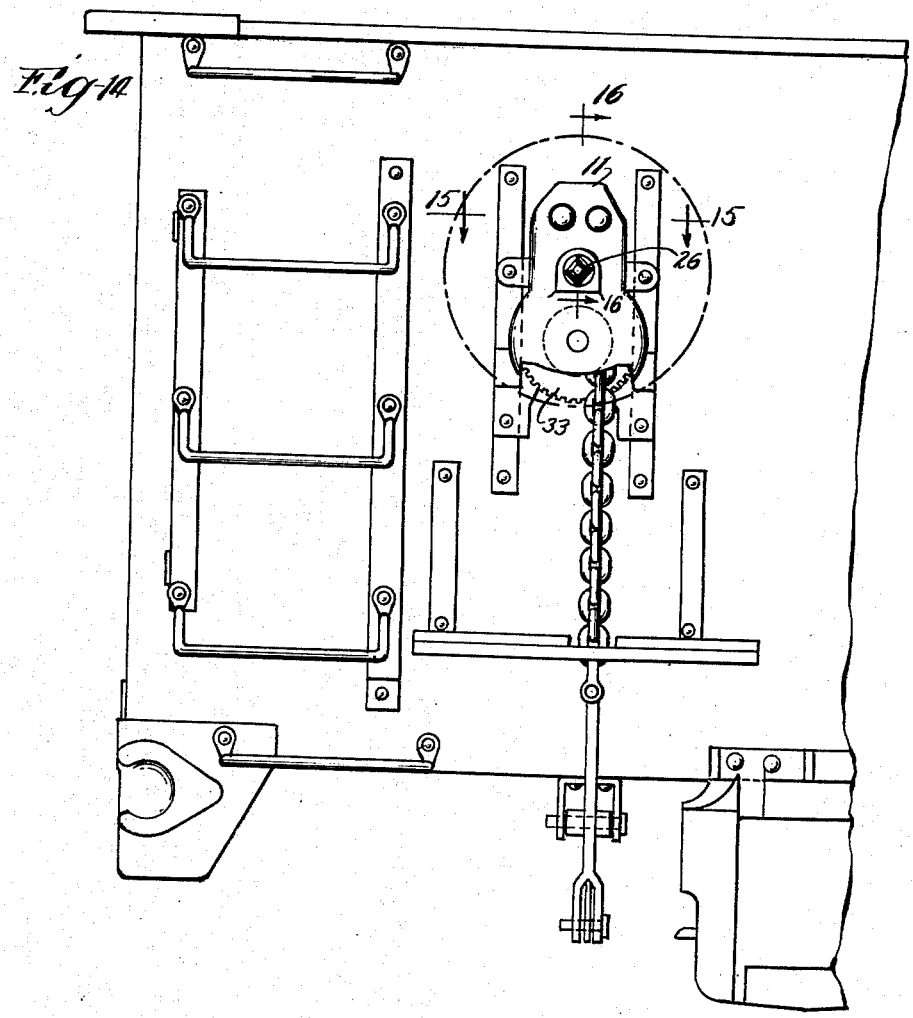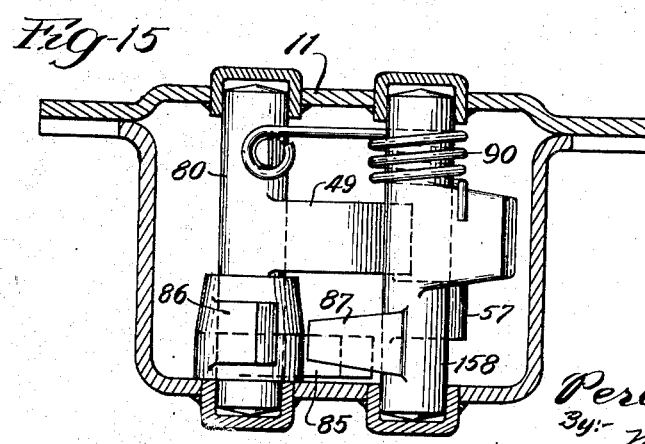

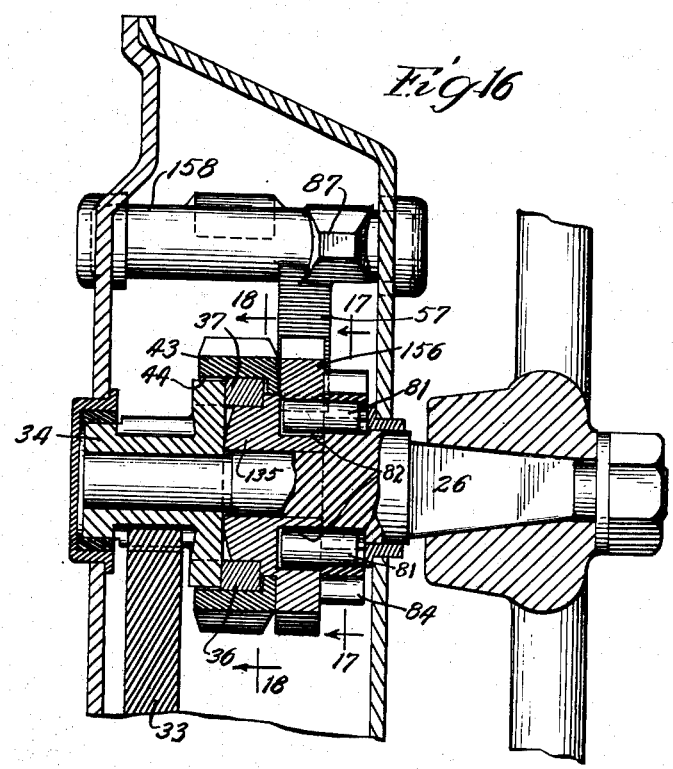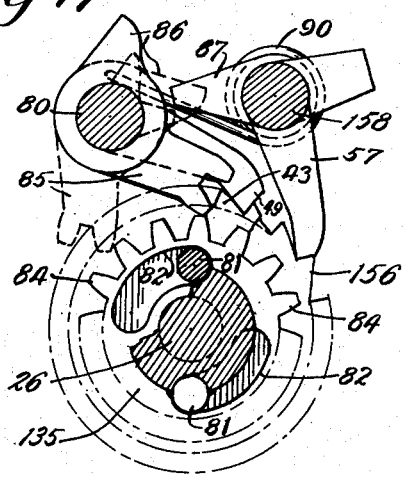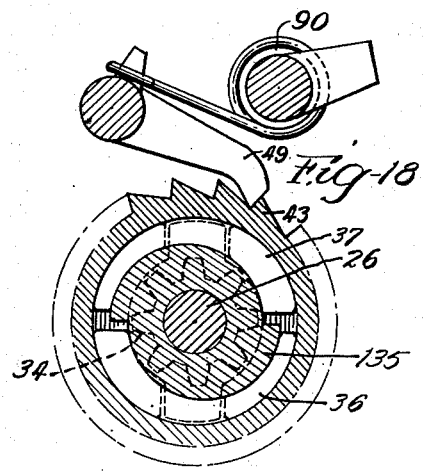

Patented Aug. 24, 1954

2,687,196

UNITED STATES PATENT OFFICE 2,687,196

CLUTCH AND BRAKE OPERATING MECHANISM

Percy B. Camp, Maywood, Ill., assignor to Universal Railway Devices Company, a corporation of Delaware Application August 20, 1949, Serial No. 111,543

10 Claims. (Cl. 192—15)

1

This invention supplements the brake operating mechanism of my Patent No. 2,416,251, February 18, 1947, which includes a railway brake mechanism, an actuating mechanism, and a clutch means for operatively connecting the actuating means with the brake mechanism, and the invention has for its principal object to provide a holding device for the actuating means.

Specifically, the selected embodiment here illustrated provides an additional ratchet on the shaft of the actuating means cooperating with a pawl that is set by the rotation of the shaft to apply the brakes.

In the drawings:

Fig. 1 is a diagrammatic front view of the brake applied to a fragment of a car end and having the hand wheel removed;

Fig. 2 is a vertical section on the line 2—2 of Fig. 1;

Fig. 3 is a vertical section on the line 3—3 of Fig. 2;

Fig. 4 is a horizontal section on the line 4—4 of Fig. 2;

Figs. 5 and 6 are vertical sections on the lines 5—5 and 6—6 of Fig. 2;

Fig. 7 is a perspective view of one of the cam shoes forming a part of the clutch means;

Fig. 8 is a perspective view of a hand lever shaft for operating the auxiliary pawl;

Fig. 9 is a perspective view of the auxiliary pawl and its shaft;

Fig. 10 is a perspective view of the hand wheel shaft;

Fig. 11 is a diagram in perspective to indicate the interrelation between the hand wheel shaft and the auxiliary pawl and its shaft;

Fig. 12 is a perspective view of the primary pawl;

Fig. 13 is a perspective view of a loose connector mounted on the shaft shown in Fig. 9;

Fig. 14 is a diagrammatic view of another brake applied to a portion of the end of a car;

Fig. 15 is a horizontal section on the line 15—15 of Fig. 14;

Fig. 16 is a vertical section on the line 16—16 of Fig. 14; and

Figs. 17 and 18 are sectional views on the lines 17—17 and 18—18, respectively, of Fig. 16.

The railway brake mechanism is here represented by a gear 33 and a pinion 34 (Figs. 2 and 16) which transmits the power to the foundation brake gear through a winding drum or the like, and corresponds to the like mechanism of my prior patent.

The actuating means is represented by the

2 hand wheel shaft 26 corresponding to that shown in my prior patent.

The clutch means includes a cam member 35 on a hand wheel shaft 26 as the inner clutch member or surface, the drum 40 as the outer clutch member or surface, and two cam shoes 36 and 37 corresponding to those parts of my prior patent.

The cam shoes 36 and 37 are provided with notches 46 to receive driving lugs 48 on the pinion 34, which is somewhat different but analogous to the arrangement in the prior patent.

The drum 40 is integral with a ratchet wheel 43 cooperating with a pawl 49 (Fig. 12) pivoted on a rigid sleeve 51 carried by a casing 11 (Fig. 4), which corresponds to the arrangement in the prior patent including two pawls 49 and 51.

When the hand wheel shaft 26 is rotated clockwise, the cam surfaces 38 and 39 on the cam member 35 force the cam shoes 36 and 37 into frictional engagement with the drum surface 44, and rotate the ratchet wheel 43. The shoes 36 and 37, through the notches 46 and the driving lugs 48, drive the pinion 34 and the gear 33 of the brake mechanism. The pawl 49 clatters over the ratchet teeth of the ratchet 43 and prevents release movement until the hand wheel is positively reversed to ease the pressure of the cam members 38 and 39 against the shoes 36 and 37, and of those shoes against the drum surface 44, when there will be a slipping and a corresponding releasing of the brake mechanism due to the retrograde movement of the driving pinion 34. That, however, causes the shoes 37 to ride up on the cam members 38 and 39 and again engage the clutch.

The net result is that the brakes can be released only by continual counter-clockwise rotation of the hand wheel and the shaft 26.

According to the present invention, an additional ratchet and pawl are added to hold the parts in brake-applying position until positive release by the operator—in one instance, by throwing a hand lever; and, in the other instance, by counter-clockwise rotation of the hand wheel shaft 26.

In the form illustrated in Figs. 1–13 (Sheets 1, 2, and 3), an auxiliary ratchet wheel 56 (Figs. 2 and 3) is fixed on the hand wheel shaft 26 outwardly with respect to the cam member 35. It is smaller than the ratchet wheel 43 on the drum 44 and cooperates with an auxiliary pawl 57 (Figs. 3 and 9) on an auxiliary pawl shaft 58 journalled in the casing 11. That pawl and ratchet serves to hold the hand wheel shaft 26 against counter-clockwise rotation until the auxiliary pawl is actually released.

In the form under consideration here, that auxiliary pawl is released from the ratchet 56 by a hand lever 60 (Fig. 1) on a hand lever shaft 61 (Figs. 4 and 8) journalled in a pawl sleeve 51 welded in the casing 11. That hand lever has a position at the right in Fig. 3 to release the auxiliary pawl and at the left in that figure to set the pawl 57.

As the hand lever is thrown from the position indicated at the left in Fig. 3 to that shown at the right, the parts shown in Fig. 5 take the dotted positions shown in Fig. 6 and lift the pawl 57 out of engagement with the ratchet 56. To accomplish this, the hand lever shaft 61 is provided with an operating arm or cam 62 (Figs. 5 and 8) adapted to cooperate with an arm 63 on the pawl shaft 58 (Fig. 9) to rotate that shaft counter-clockwise and raise the pawl from the engaged position shown in Fig. 3 clear of the ratchet 56.

The pawl 57 being thus disengaged, the brakes may be released by counter-clockwise rotation of the shaft 26, as in my prior patent.

When the brake is to be applied, the pawl 57 should be engaged with the ratchet 56; and, according to this invention, that is made automatic when the hand wheel is rotated clockwise to drive the hand wheel shaft 26.

To accomplish this, when the clutch effects a driving relation between the shaft 26 and the ratchet wheel 43, a tooth on that wheel runs under the primary pawl 49 and lifts it, rotating it about the sleeve 51. The back side of the pawl 49 is provided with a lug 65 (Fig. 12), which strikes a short lug 66 on a connector piece 67 (Fig. 13) loosely pivoted on a cylindrical portion 68 of the pawl shaft 58 (Fig. 9; see also Fig. 11), which connector piece 67 has a long cam arm 69 that engages the arm 62 on the hand lever shaft when it is in the position shown in dotted lines in Fig. 6, and throws that shaft toward the position shown in Fig. 5, swinging the hand lever 60 counter-clockwise from the right position, shown in Fig. 3, toward the left position shown in that figure past center, when its weight carries it to full left position.

As the arm 62 approaches the position shown in Fig. 5, another arm 12 on the hand lever shaft 61 strikes the arm 63 on the pawl shaft 58 and throws the auxiliary pawl 57 toward the ratchet wheel 56, and its weight or a spring brings that pawl into engagement with the ratchet wheel. For obvious reason, the connecting piece 67 has lost motion with respect to the shaft 58 provided by the wide notch 71 between shoulders 72 in which the arm 73 on the shaft 58 is received.

The connector 67 in Fig. 13 cannot be shown on the shaft 58 (Fig. 9) without obscuring some of the other parts. In the diagram in Fig. 11, the shafts 58 and 61 are extended to the right to make pawls 49 and 57 visible beyond the arm 62.

With this form of the invention, rotating the hand wheel shaft 26 to the right applies the brakes. If the hand lever 60 is in the right-hand position, it is automatically thrown over to the left and the pawl 57 engaged with the ratchet 56. Hence, as the brakes are set, the two pawls 57 and 49 hold both the brake mechanism and the actuating means.

When it is desired to release the brakes, the hand lever 60 is thrown to the right (Fig. 3), manually releasing the pawl 57, after which, by rotating the hand wheel shaft 26 counter-clockwise, the brake will be eased off under control of the one-way clutch interposed between the shaft 26 and the pinion 34.

In the form shown in Figs. 14–18 (Sheets 4 and 5), the operation is much the same as in the other form except that the release of the auxiliary pawl is automatic following the counter-clockwise rotation of the hand wheel shaft 26.

In this form, the railway brake mechanism is represented by the pinion 34 and the gear 33, the actuating means by the shaft 26, the clutch means by the clutch member 135, the shoes 36 and 37 and the drum surface 44.

The pawl 49 for the ratchet wheel 43 is made integral with the pawl shaft 80 (Figs. 15 and 17) journalled in the casing 11.

The auxiliary pawl 57 is on a shaft 158 (Figs. 15 and 17), also journalled in the casing 11.

The auxiliary ratchet wheel 156 and the cam member 135 are in one piece loose on the shaft 26 for movement less than 90 degrees allowed by the pins 81 in the slots 82 (Figs. 16 and 17). That lost motion between the shaft 26 and the cam member 135 and the ratchet 156 allows for automatic operation of the pawl 57 by the shaft 26.

To accomplish this, a gear or gear segment 84 fixed on the shaft 26 cooperates with a toothed arm 85 loose on the pawl shaft 80 and integral with an arm 86 adapted to cooperate with an arm 87 on a pawl shaft 158 to shift the pawl 57.

Turning now to Fig. 17, and assuming the brakes to be applied and the pawls 49 and 57 to be engaged with the ratchets 43 and 156 and that it is desired to release the brakes, the hand wheel shaft 26 is rotated counter-clockwise. The lost motion device formed by the pins 81 and the slots 82 allows the shaft to rotate through a suitable arc without disturbing the clutch. During that movement, the teeth of the gear segment 84 engage the toothed arm 85 and swing it from the solid line position in Fig. 17 to the dotted line position, taking the arm 86 from the solid line position in Fig. 17 to the dotted line position, making it engage the arm 87 on the pawl shaft 158 and release the pawl 57 from the ratchet 156.

Continued counter-clockwise rotation of the shaft 26 will gradually release the clutch and allow a gradual release of the brakes as before described.

Upon clockwise rotation of the shaft 26, the gear segment 84 will engage the arm 85 and shift it with the arm 86 from the dotted line position shown in Fig. 17 to the solid line position shown in that figure, releasing the pawl 57 and allowing it to engage with the ratchet 156.

The pawl shaft 158 is here shown with a spring 90 to positively engage the pawl 57.

The toothed lever arm 85 of this modification corresponds to the hand lever 60 of the first form described.

In the operation of the first form, the lever 60 is manually thrown to the right when it is desired to release the auxiliary pawl and permit counterclockwise rotation of the shaft 26. Clockwise rotation of the shaft throws the lever 60 to the left, and permits the auxiliary pawl 57 to engage the ratchet 56.

In the second form, the engagement between the gear segment 84 and the arm 85 gives the shaft 26 automatic control over the lever including the arm 85, and hence the pawl 57.

I claim:

1. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, and means associated with the ratchet means for releasing said pawl.

2. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a lever operative to release the pawl, and means associated with the ratchet means to shift the lever when the brake applying means is to be actuated.

3. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a pivoted lever operative to hold the pawl released, and means associated with the ratchet means to swing the lever to inoperative position when the brake applying means is actuated.

4. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a lever operative to release the pawl, and means operated by rotating the shaft to shift the lever.

5. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a pivoted lever operative to lift the pawl from the ratchet, and means on the shaft to swing said lever.

6. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a pivoted lever mounted for swinging movement in one direction to lift the pawl from the ratchet and in the opposite direction to release the pawl to permit engagement thereof with the ratchet, and means on the shaft operative to swing said lever in each direction.

7. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a pivoted bell crank lever operative to lift the pawl from the ratchet, and means on the shaft to swing said lever.

8. In apparatus of the class described, a brake applying means, actuating means therefor including a shaft, clutch means operative to connect the shaft and the brake applying means, ratchet means to hold the brake applying means independent of the shaft, a ratchet wheel on the shaft, a pawl engageable with the ratchet wheel, a pivoted bell crank lever swingable in one direction to lift the pawl from the ratchet and in the opposite direction to release the pawl to permit engagement thereof with the ratchet, and means on the shaft for swinging said lever in each direction.

9. In apparatus of the class described, a brake applying means, actuating means including a shaft, clutch means mounted on the shaft and including a pair of elements one of which is fixed to the shaft and the other of which is rotatable relative thereto and is connected to the brake applying means, a pair of ratchet wheels one of which is carried by the relatively rotatable element of the clutch means and the other of which is connected to said shaft, pawls engageable with said ratchets, the pawl for said first-mentioned ratchet wheel being manually disengageable therefrom, and means operable upon disengagement of such pawl from its ratchet wheel to disengage the other pawl from the other ratchet wheel.

10. In apparatus of the class described, a brake applying means, actuating means including a shaft, clutch means mounted on the shaft and including a pair of elements one of which is fixed to the shaft and the other of which is rotatable relative thereto and is connected to the brake applying means, a pair of ratchet wheels one of which is carried by the relatively rotatable element of the clutch means and the other of which is connected to said shaft, pawls engageable with said ratchets, manual means to disengage said one pawl from the relatively rotatable element of the clutch means, and means operative upon manual disengagement of such pawl to move the other pawl out of engagement with the other ratchet wheel.

References Cited in the file of this patent

UNITED STATES PATENTS

| Number | Name | Date |
|---|---|---|
| 1,154,508 | Graumiiler | Sept. 21, 1915 |
| 1,858,490 | Fuchs | May 17, 1932 |
| 1,865,631 | Heitner | July 5, 1932 |
| 2,416,251 | Camp | Feb. 18, 1947 |